Figure 1A:
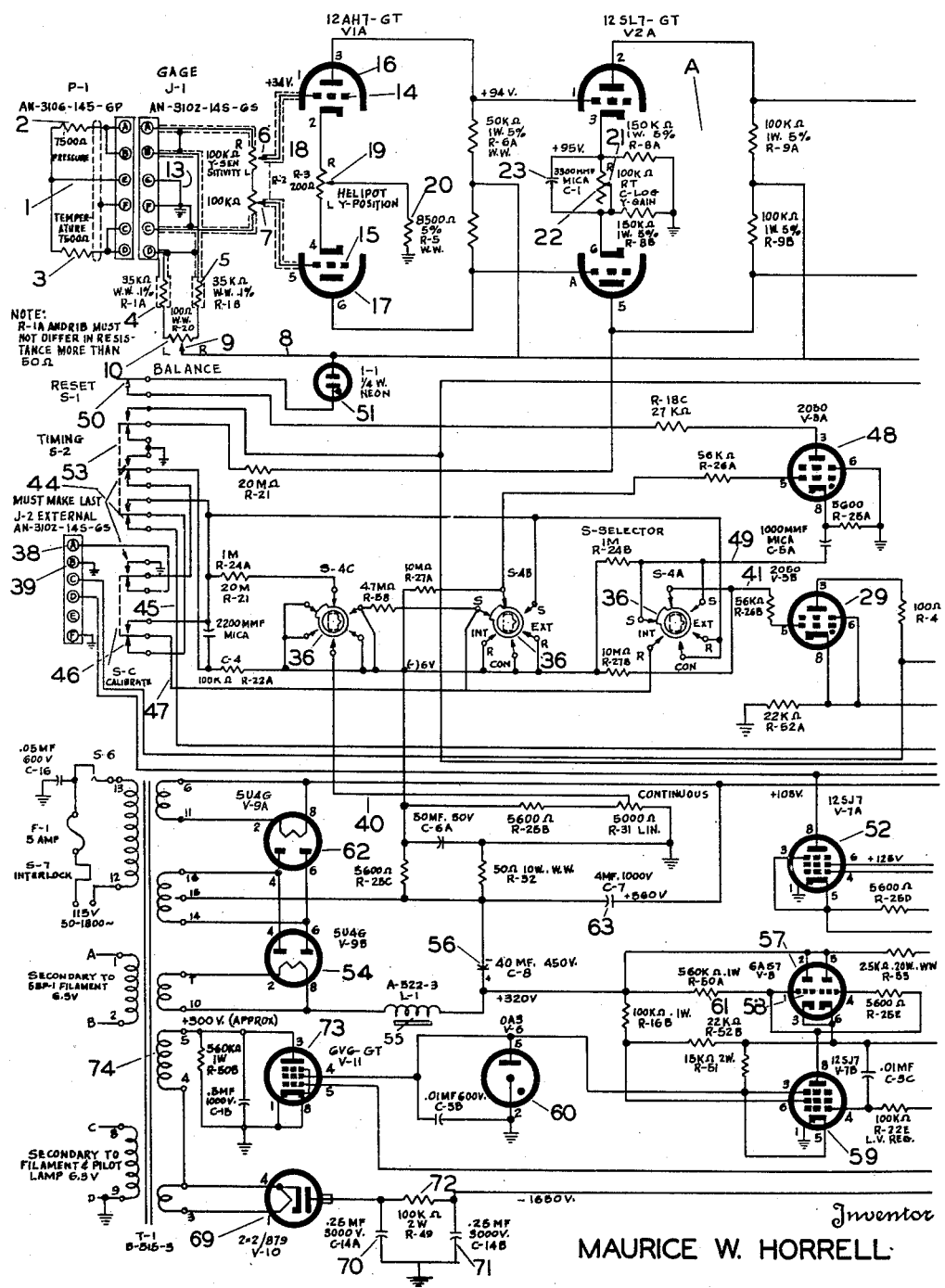

MAURICE W. HORRELL

United States Patent Office

2,771,555
Patented Nov. 20, 1956

2,771,555

APPARATUS FOR INDICATING AND/OR RECORDING PRESSURE CONDITIONS

Maurice W. Horrell, Detroit, Mich., assignor to Aeroquip Corporation, Jackson, Mich., a corporation of Michigan Continuation of application Serial No. 787,586, November 22, 1947. This application October 9, 1951, Serial No. 250,541

3 Claims. (Cl. 250—27)

This invention relates to oscilloscope apparatus for indicating and/or recording pressure conditions, whether static or transient, in liquids, gases or solids, as a function of time or mechanical motion, typical such conditions being pressure surges in fluid conduits and vibratory motion of solids or gases (as in acoustics). In particular the invention relates to apparatus of this kind which will provide an accurate visual or photographic presentation of fluid pressure phenomena, whether static or transient in nature, in a frequency band up to 20,000 cycles per second. This application is a continuation of Serial No. 787,586, filed November 22, 1947, now abandoned.

In connection with the analysis and recording of hydraulic pressure changes, in particular, it is often desirable that it should be possible to make recordings and observations in respect of a single trace upon the oscilloscope screen and that in respect to such single trace it should be possible, at times, to determine the time factor involved. Such, for instance is of particular importance when it is desired to make a photographic recording of the trace.

In connection with the commercially available oscilloscopes, it is recognized as possible to produce a single trace on the screen and also to observe the time factor involved, but hitherto it has not been possible to confine the trace to a single complete trace without a continuation of such traces, or to provide the time indication on the screen in spaced relation to the trace. In the known oscilloscopes which provide for the obtaining of a single trace on the screen this occurs in continuous manner, with the traces following one another in quick succession, such that the obtaining of a photographic record of the trace is not readily possible. Where in the known oscilloscopes a time indication has been given in association with the trace, this has involved superimposing the time indicator upon the trace itself, in the form of spaced dots, rendering observance and comparison difficult.

It is an object of the present invention to provide improved oscilloscope apparatus of the above kind with which it is possible to obtain a single complete trace upon the screen in a non-recurring manner, to the extent that it is necessary to actuate a re-set switch before a second trace can occur.

It is also an object of the invention to provide improved oscilloscope apparatus of the above kind with which it is possible to obtain on the screen a time base wave which is separate from the corresponding trace.

The following method of carrying the invention into effect is given by way of example, reference being made to the accompanying circuit diagram in which suitable values of components are indicated.

Figure 1B:
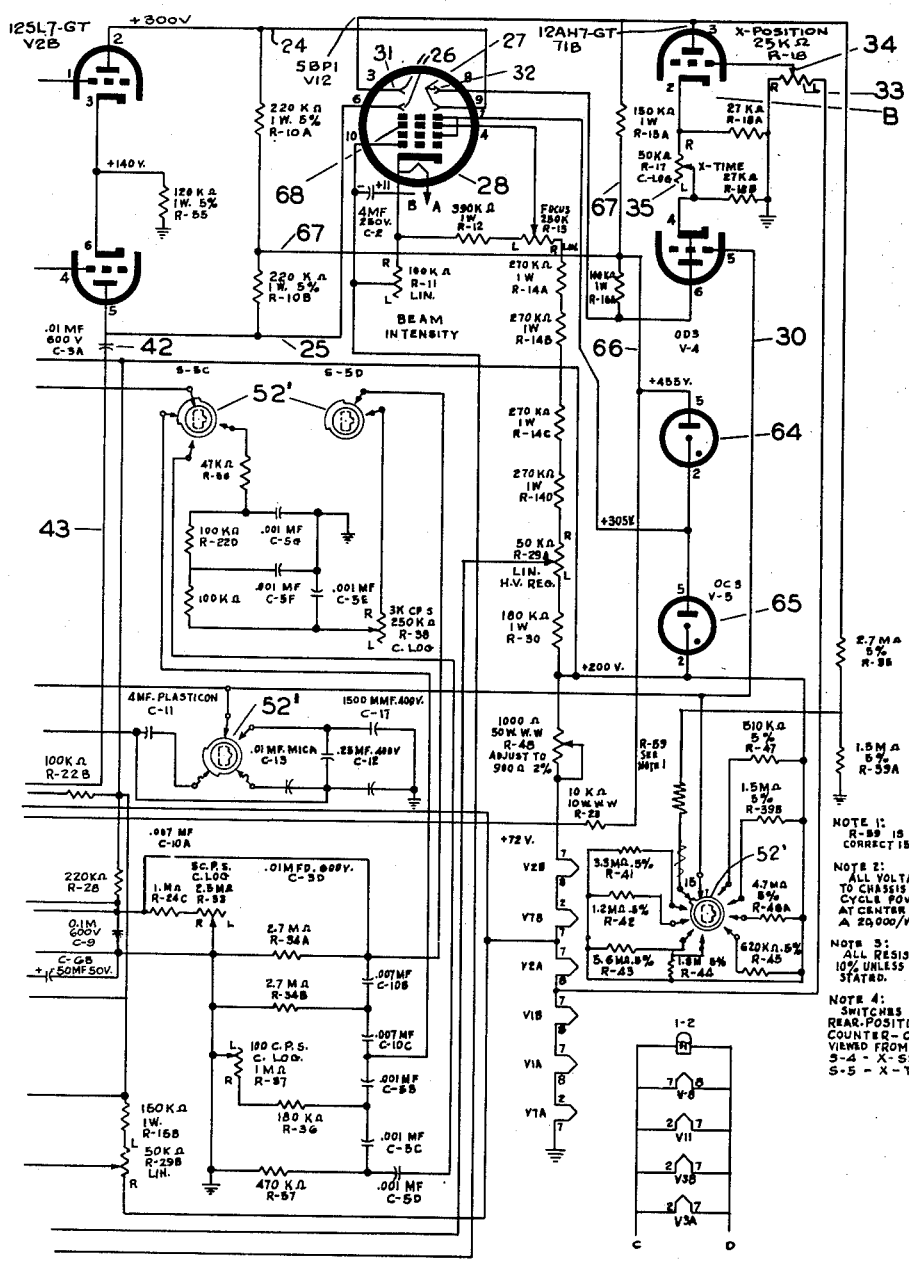

For convenience of illustration this circuit diagram has been subdivided into two sections constituted by Figure 1a, which is the left-hand section, and Figure 1b, which is the right-hand section.

In the drawing, 1 indicates a pressure pick-up device as described and claimed in Patent Number 2,544,567, granted March 6, 1951. 2 is a winding which is influenced by the pressure to be indicated and/or recorded and which will be assumed to be fluid pressure, and 3 is a similar winding serving for temperature compensation. Winding 2 is wound under tension on a metal tube having an anodized surface, the tube being relatively thin walled and adapted to transmit pressure influences to the winding. Winding 3 is similar to winding 2 and is wound on a support uninfluenced by the fluid pressure to be measured but subjected to the same temperature conditions. The two windings are serially connected and are arranged in the form of a bridge with resistors 4 and 5.

Current is supplied to the bridge by conductor 8 from a source hereinafter described, the conductor 8 being connected to a variable tap 9 of a resistance 10, the outer ends of which are connected to the connections between windings 2 and 3 and resistors 4 and 5. The current circuit is completed by the earth connection 13 from the connection between the windings 2 and 3. The variable tap 9 allows for satisfactory balancing of the bridge.

The variable taps 6 and 7 are connected to the grids 14 and 15 respectively of the first two valves 16 and 17 of a three stage push-pull amplifier A. The said valves may conveniently be in the form of a 12A7–GT tube or other tube of similar characteristics operating with sufficiently negative grid potential as to prevent grid current flow. In the cathode circuit of the valves is connected a resistor 18 having a variable tap 19 connected to earth through a resistor 20. The tap 19 provides control of the "Y" position of the beam of the oscilloscope referred to hereafter. The variable taps 6 and 7 provide adjustment of the "Y" axis sensitivity.

The tubes for the second and third stages of the amplifier are preferably 12SL7–GT or tubes of similar characteristics giving high voltage gain. Sensitivity of the amplifier is controlled by a variable tap 21 of resistor 22 in the cathode circuit of the tubes of the second stage, a small condenser 23 being placed across resistor 22 to ensure substantially uniform response to all the frequencies up to 20,000 cycles per second. The output from the third stage of the amplifier is fed by conductors 24 and 25 to deflecting plates 26, 27 of the cathode ray oscilloscope 28 giving the "Y" axis control.

The "X" axis time base generator comprises a thyratron 29 and a resistance capacity charging circuit, the generator being directly connected to amplifier "B" by conductor 30. The tube of the amplifier "B" is preferably 12AH7–GT. The output of the amplifier is fed to the horizontal deflecting plates 31, 32 of the oscilloscope 28. The starting position of the trace is controlled by resistor 33 and the variable tap 34, and the rate of beam travel by the variable resistor 35 in the cathode circuit of the tubes of the amplifier "B."

Switch 36 allows of different triggering of the thyratron tube 29. In the continuous position of the switch the grid bias of the tube is adjusted by resistor 37 to the point where the thyratron tube acts as a relaxation oscillator. The oscillations may be synchronized by application of a signal between the terminals 38 and 39. Connections from the resistor 37 to the grid of the thyratron tube 29 are wire 40, switch 36, and wire 41. In the internal repeat position of the switch 36 sufficient bias is applied to the thyratron grid as to prevent it ionizing until it receives a signal from the output of the amplifier "A" by way of condenser 42, wire 43, contact 44, wire 45, contact 46, wire 47, switch 36, and wire 41. In the external repeat position, the thyratron tube 29 may be triggered by simply shorting terminals 38 and 39. This may be done by means of a suitable contactor operated by some element of the hydraulic system. Each time the circuit is closed the thyratron tube 29 will receive a trigger pulse.

In the external single position of the switch 36 a second thyratron tube 48 is connected between the terminals 38 and 39 and the grid of the thyratron tube 29. When the terminals 38 and 39 are connected the thyratron tube 48 conducts and sends a signal to the thyratron tube 29 by way of wire 49, switch 36 and wire 41. Since there is no condenser in the anode circuit of the thyratron tube 48, this tube will remain conductive regardless of the opening and closing of the connection between the terminals 38 and 39 until the anode circuit is broken by opening switch 50. Since the thyratron tube 29 can receive a signal only at the instant the other thyratron tube 48 begins to carry current, it will be appreciated that only one trace will be drawn, unless the switch 50 is operated. The neon lamp 51 glows during the time that the thyratron tube 48 is conducting and serves to indicate the start of the trace.

In the internal single position of the switch 36, which is that shown in the circuit diagram, the trace is initiated by a position signal from the amplifier "A" by way of the condenser 42.

In order to provide accurate indication of time intervals on the "X" axis, a stable resistance capacity coupled oscillator is provided comprising the tube 52 which is desirably a type 12SJ7, connected so that the frequency of oscillation is controlled by switch 52' having 9 positions. In the first three positions the timing wave has a frequency of 5 cycles per second, in the next three positions the frequency is 100 cycles per second and in the last three is 3,000 cycles per second. The switch is shown in the circuit diagram in the first position in which the timing wave has a frequency of 5 cycles per second.

The timing wave is connected to the amplifier "A" by the switch 53 which when depressed causes cathode-ray beam to move down on the screen approximately one-quarter inch so that the timing wave appears on the viewing screen below the normal zero axis. The timing wave is intended primarily for use in connection with photographing the trace since no provision is made for synchronization with the continuous sweep.

A low voltage power supply of approximately 200 volts for the operation of the heaters of the tubes and most of the plate circuits is provided. The rectifier 54, which is preferably a 5U4G type rectifier, feeds a filter consisting of the choke 55 and the condenser 56. Close regulation of the voltage is provided by the series tube 57, preferably a type 6AS7 operating against a reference voltage from the tube 60, preferably type OA3. Should the voltage tend to rise, amplifier 59 will draw more current increasing the drop through resistor 61 and so lowering the grid voltage of the tube 57. A voltage divider is adapted so that sufficient unregulated voltage reaches the screen of tube 59 to compensate exactly for changes in the line voltage and provide extremely close regulation of the output voltage.

A medium voltage supply is provided by tube 62, preferably also a 5U4G type, with a capacity filter 63. The output is regulated by two gas tubes 64, 65, the former preferably an OD3 type and the latter an OC3 type. Tube 65 connects to the 220 volt supply referred to above so that voltages of 305 and 455 are available as indicated in the drawing. The 455 volt supply is applied to the plates of amplifier B via conductors 66 and 67, and to the final stage of amplifier A via conductors 66 and 67. The second anode 68 of the cathode ray tube 28 is connected to the 305 volt point which is the approximate average voltage of the deflection plates, a necessary condition for obtaining sharp focus.

A high voltage supply to provide the cathode ray tube with minus 1650 volts is obtained from rectifier 69, a 2 x 2/879 type. The filter is composed of condensers 70 and 71 and resistor 72. Regulation of the supply voltage is obtained through the action of tube 73, a 6V6-GT type, connected in the return circuit of the high voltage transformer winding 74. If the output voltage of the supply should increase, the grid of tube 73 will be made more negative and the plate cathode resistance will increase, thereby increasing the voltage drop and reducing the output voltage.

The invention is not limited to the precise arrangement or details above described but is capable of modification to suit particular requirements and conditions. Thus, movement of the beam in the "X" axis can also be controlled by the mechanical actuation of a variable potentiometer, which could be linked mechanically to the movement of a device under investigation (such as a valve, piston or other actuator) so as thus to allow of the recording of pressure conditions as a function of mechanical motion.

Having thus described my invention, what I claim as new and desire to protect by Letters Patent is:

1. In electrical oscilloscope voltage measuring and indicating apparatus comprising a time base generator direct coupled to a push-pull amplifier and in which the time base generator includes a thyratron tube and a resistance capacity charging circuit, a triggering circuit for controlling the operation of the time base generator, said triggering circuit comprising a second thyratron tube and a selector switch, said selector switch including contacts connected with the grid and the cathode of the first and the second thyratron tubes, respectively, and including an adjustable contactor for electrically connectnig said contacts, a re-set switch included in the anode circuit of said second thyratron tube for rendering said second tube non-conductive, said first thyratron tube being then incapable of receiving a signal, means for applying negative bias to the grid of the second thyratron tube, said bias being effective to maintain said second thyratron tube non-conductive when said re-set switch is again closed, and means for rendering said negative grid bias ineffective so that said second thyratron tube can again become conductive, said first thyratron tube being capable of receiving a signal only when and at the instant said second thyratron tube is rendered conductive.

2. Apparatus as claimed in claim 1, said means for rendering said negative grid bias ineffective comprising means for applying a positive signal to the said grid in cancelling relation to said negative bias.

3. Apparatus as claimed in claim 1, said means for rendering said negative grid bias ineffective comprising means for short-circuiting said bias.

References Cited in the file of this patent

UNITED STATES PATENTS

| | | |
|---|---|---|
| 1,977,256 | Swart | Oct. 16, 1934 |
| 2,032,514 | Swart | Mar. 3, 1936 |
| 2,197,751 | Bahring | Apr. 16, 1940 |
| 2,233,948 | Kock | Mar. 4, 1941 |
| 2,360,857 | Eldredge | Oct. 24, 1944 |
| 2,398,372 | Green | Apr. 16, 1946 |
| 2,412,210 | Edson et al. | Dec. 10, 1946 |
| 2,416,276 | Ruge | Feb. 18, 1947 |
| 2,477,770 | Richter | Aug. 2, 1949 |
| 2,524,053 | Halpert | Oct. 3, 1950 |
| 2,552,884 | Cannon | May 15, 1951 |
| 2,580,407 | Clark | Jan. 1, 1952 |
| 2,680,808 | Nolde | June 8, 1954 |

FOREIGN PATENTS

| | | |
|---|---|---|
| 565,378 | Great Britain | Nov. 8, 1944 |